United States Patent [19]

McMillan

[11] Patent Number: 4,997,613
[45] Date of Patent: * Mar. 5, 1991

[54] METHOD FOR INSTALLING END CAPS ON TUBULAR MEMBERS

[75] Inventor: Jim S. McMillan, Fort Worth, Tex.

[73] Assignee: Simon Tarsha, Edgecliff, Tex.

[*] Notice: The portion of the term of this patent subsequent to May 8, 2007 has been disclaimed.

[21] Appl. No.: 348,885

[22] Filed: May 8, 1989

Related U.S. Application Data

[63] Continuation-in-part of Ser. No. 258,796, Oct. 17, 1988, Pat. No. 4,923,663.

[51] Int. Cl.⁵ .................... B29C 43/46; B29C 57/00; B29C 63/34; B29C 63/38
[52] U.S. Cl. .................... 264/229; 264/249; 264/269; 264/280; 264/296; 264/322; 264/516
[58] Field of Search .............. 264/229, 248, 249, 269, 264/280, 296, 322, 339, 516; 156/294, 309.6, 309.9

[56] References Cited

U.S. PATENT DOCUMENTS

| | | | |
|---|---|---|---|
| 1,708,141 | 4/1929 | Kepler | 29/451 |
| 3,142,868 | 8/1964 | Blount | 264/269 |
| 3,462,825 | 8/1969 | Pope et al. | 29/451 |
| 3,494,813 | 2/1970 | Lawrence et al. | 156/287 |
| 4,325,772 | 4/1982 | Suetoshi et al. | 156/294 |
| 4,427,480 | 1/1984 | Kamuro et al. | 156/294 |
| 4,525,319 | 6/1985 | Kaspe | 264/322 |

FOREIGN PATENT DOCUMENTS

| | | | |
|---|---|---|---|
| 0226410 | 6/1987 | European Pat. Off. | 156/293 |
| 2084686 | 4/1982 | United Kingdom. | |

OTHER PUBLICATIONS

Gas World, Feb. 1987.
Pipeline & Utilities Construction, Jul. 1987.

Primary Examiner—Michael W. Ball
Assistant Examiner—Steven D. Maki
Attorney, Agent, or Firm—Charles D. Gunter, Jr.

[57] ABSTRACT

A method and apparatus are shown for lining a tubular member with an elastomeric liner having an outside diameter which is initially greater than the inside diameter of the tubular member and a length which is greater than the length of the tubular member. A length of the liner is reduced to a downsized outside diameter and inserted into the tubular member to be lined. The liner is allowed to expand to substantially its original outside diameter to thereby bond the liner within the tubular member, the liner opposite ends still extending outwardly from the opposing ends of the tubular member. The outside diameter of the liner opposite ends is then increased to approximately the outside diameter of the tubular member by heating and reforming that portion of the liner opposite ends which extends outwardly from the opposing ends of the tubular member.

8 Claims, 5 Drawing Sheets

METHOD FOR INSTALLING END CAPS ON TUBULAR MEMBERS

BACKGROUND OF THE INVENTION

1. Cross-reference To Related Applications.

The present application is a continuation-in-part of my co-pending application, Ser. No. 258,796, filed Oct. 17, 1988, entitled "Apparatus And Method Of Lining Tubular Members" now U.S. Pat. No. 4,923,663.

2. Field of the Invention.

The present invention relates generally to a method and apparatus for lining a tubular member, such as a steel pipe, with a synthetic liner, and to a method and apparatus for installing end caps on the opposing ends of the tubular member.

3. Description of the Prior Art

Fluid-carrying pipes are often subject to corrosion and other conditions which are detrimental to the life of the pipe, or to the fluids moving through the pipe. Plastic inserts have been used in the past for protective purposes but generally involve cumbersome and difficult procedures for effectively installing such liners, and particularly in sealing them to the wall of pipe.

U.S. Pat. No. 3,494,813, to Lawrence et al, Feb. 10, 1970, shows a method for installing a plastic liner in a pipe by using vacuum to draw the liner into the pipe and to assure tight sealing engagement between the liner and the pipe wall.

U.S. Pat. No. 1,708,141, to Kepler, Apr. 9, 1929, shows a method of lining a pipe with an elastomeric lining in which the lining is pushed through a reducing die and coated with cement.

U.S. Pat. No. 3,462,825, to Pope et al, Aug. 26, 1969, shows a method for lining a tubular member with a fluorocarbon liner having an initial outside diameter greater than the inside diameter of the tubular member. The liner is placed in the tubular member by gripping one end of the liner and pulling it through a reducing die and into the tubular member. The liner is then released, allowing it to expand into engagement with the inner wall of the tubular member. Although certain of the above methods have attempted to install synthetic liners within tubular conduit without the use of heat, adhesives or vacuum, these methods have generally failed to effect a linear elongation of the synthetic liner so that the liner maintains a standard dimensional ratio and returns to a predetermined size to fill out and conform to the internal diameter of the surrounding pipe.

An object of the present invention is to provide an improved synthetic liner for a tubular member in which the liner is firmly held in position within the tubular member by reason of radial pressure exerted on the tubular member by the synthetic liner.

Another object of the invention is to provide a method for installing a liner within a tubular member which places the liner in a condition of circumferential compression to provide a firm bond with the surrounding tubular member.

Another object of the invention is to provide a method for installing end caps on the opposing ends of a tubular member so that the tubular member is completely isolated from fluids being carried within the interior of the tubular member.

Another object of the invention is to provide a method for installing end caps on the opposing ends of a tubular member which does not require a calculation of the reverse expansion characteristics of the liner being installed within the tubular member.

SUMMARY OF THE INVENTION

The method of the invention is used to line a tubular member with an elastomeric liner having an outside diameter which is initially greater than the inside diameter of the tubular member. A length of the liner is first reduced to a downsized outside diameter, the length of the downsized liner being greater than the length of the tubular member to be lined. The downsized liner is then inserted into the tubular member to be lined, whereby the liner opposite ends extend outwardly from the opposing ends of the tubular member. The liner is then allowed to expand to substantially its original outside diameter to make 360° contact with the tubular member; thereby bonding the liner within the tubular member, the liner opposite ends still extending outwardly from the opposing ends of the tubular member.

The outside diameter of the liner opposite ends is then increased to approximately the outside diameter of the tubular member while maintaining a constant internal diameter for the liner by heating and reforming that portion of the liner opposite ends which extend outwardly from the opposing ends of the tubular member, whereby the increased outside diameter of the liner forms a seal with the opposing ends of the tubular member.

Additional objects, features, and advantages will be apparent in the written description which follows.

BRIEF DESCRIPTION OF THE DRAWINGS

in FIG. 1;

in FIG. 3;

DETAILED DESCRIPTION OF THE INVENTION

Figure 1:
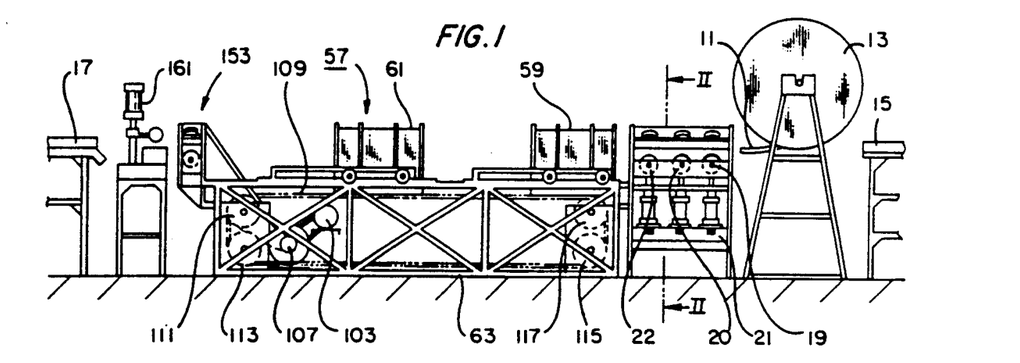
FIG. 1 is a simplified schematic view illustrating the steps for installing a liner within the interior of a tubular member in accordance with the method of the invention.

FIG. 1 is a simplified schematic view of the steps and apparatus used in the method of the invention. A length of elastomeric liner 11 is fed from a supply roll 13 or table 15 through the apparatus to a tubular member 17 to be lined. The tubular member 17 can be, for instance, a cylindrical conduit, such as a steel pipe. The elastomeric liner 11 can be any synthetic elastomer which initially has an outside diameter greater than the inside diameter of the tubular member 17 and which can be downsized and returned to substantially its original outside diameter according to the method of the invention. Preferred liner materials include polyolefin materials, with the preferred material being commercially available polyethylene pipe. It is preferred that the polyethylene pipe be of about 10 to 15% greater initial outside diameter than the tubular member to be lined. An increase in initial outside diameter of the liner increases the force necessary to downsize the liner. As a result, a liner having only slightly greater outside diameter than the tubular member 17 to be lined is preferred. The wall thickness of the liner is not critical, so long as it is great enough to permit the liner to be downsized without distortion of the liner material.

In the first step in the method, a length of the liner 11 is gradually reduced to a downsized outside diameter, the length of the downsized liner being greater than the length of the tubular member 17 to be lined. The downsizing step is preferably carried out by passing the liner through a series of aligned roller sets, each roller set serving to reduce the liner outside diameter by a preselected, gradual amount, the total percentage reduction in outside diameter being no greater than about 15%.

Turning again to FIG. 1, three sets of downsizing rollers 19,20,22 are shown located at a rolling station 21. It will be understood that the greater the number of roller sets 19,20,22, the more gradual the downsizing operation with the least stress being imparted to the liner 11.

Figure 2:
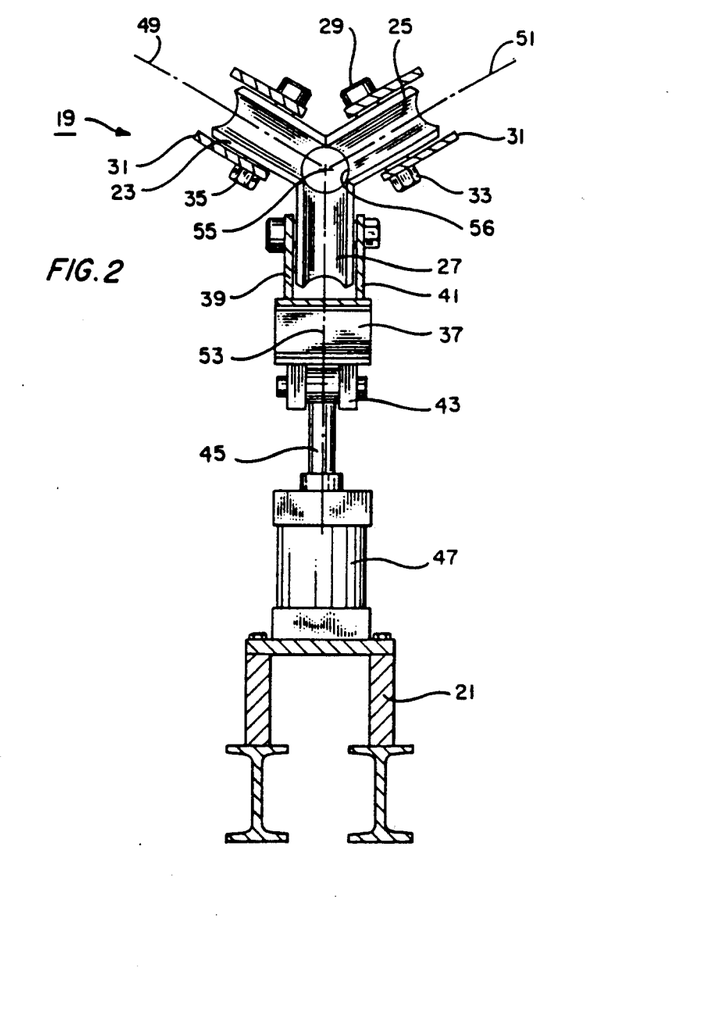
FIG. 2 is an isolated view of one set of downsizing rollers used to downsize the line, taken along lines II—II.

FIG. 2 shows one set of downsizing rollers 19 in isolated fashion for ease of illustration. Each set of downsizing rollers 19 includes three hemispherical rollers 23, 25, 27, each of which is rotatable about a shaft 29 mounted on the frame 31 of the rolling station 21. Rollers 23 and 25 are adjustably mounted on the frame portions 31, 33 of the rolling station 21 by means of nuts 33, 35. Roller 27 is mounted on a base 37 having vertically extending flanges 39, 41 and is connected by means of a yoke 43 to the output shaft 45 of a hydraulic piston 47. Hydraulic piston 47 can be selectively actuated to move the bottom roller 27 between a closed position, as shown in FIG. 2, and an open position in which the roller 27 moves vertically downward.

Each of the rollers 23, 25, 27 has a central axis of rotation 49, 51, 53 which forms a 120 degree angle with the next adjacent roller and which intersects at the midpoint 55 of a liner receiving opening 56 when the bottom roller 27 is in the closed position. In the closed position shown in FIG. 2, the three rollers 23, 25, 27 comprise a "Y"-shaped configuration which defines a 360° region of contact with the liner being fed through the liner receiving opening 56.

Since a smaller diameter roller produces a greater shock on the liner being downsized, each of rollers 21, 23, 25 has a diameter (taken along the central axis of rotation 49) at least about one and one half times the outside diameter of the liner 11. Preferably, the roller diameter is at least twice the original outside diameter of the liner 11.

As shown in FIG. 1, the three roller sets 19, 20, 22 are mounted in the rolling station 21 along the longitudinal axis defined by the midpoint 55 of the liner receiving opening 56. Each of the roller sets 20, 22 is identical in construction and arrangement to that of the first roller set 19 shown in FIG. 2. However, each of the roller sets 20, 22 is machined to provide a progressively smaller liner receiving opening. For instance, in the embodiment shown in FIG. 1, the first roller set 19 provides a 2% reduction in the original outside diameter of the liner 11 with liner set 20 providing a 4% reduction and liner set 22 providing a 6% reduction in the original outside diameter of the liner 11.

Figure 3:
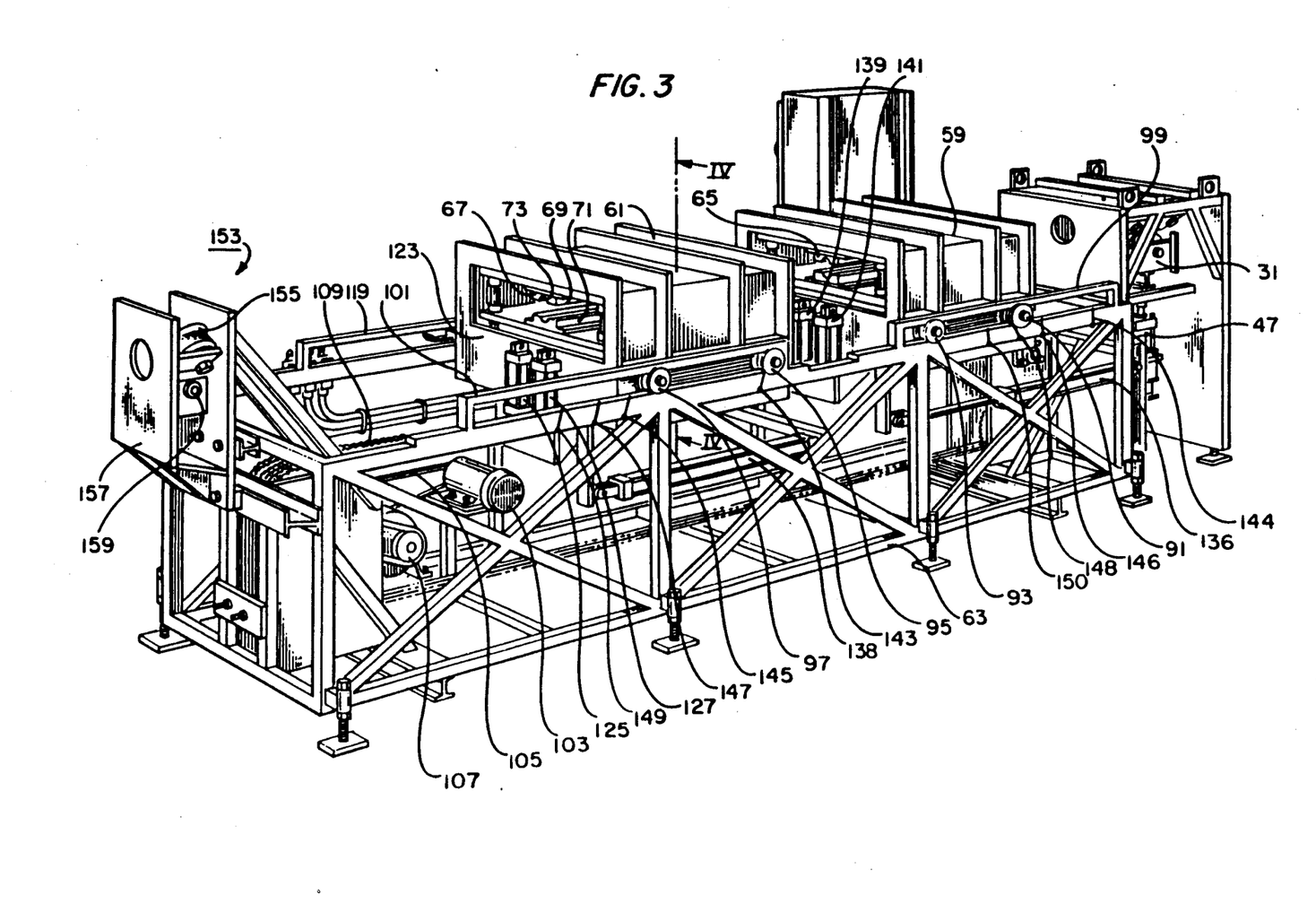
FIG. 3 is a side, perspective view of the apparatus used to install a liner within a tubular member.
Figure 4:
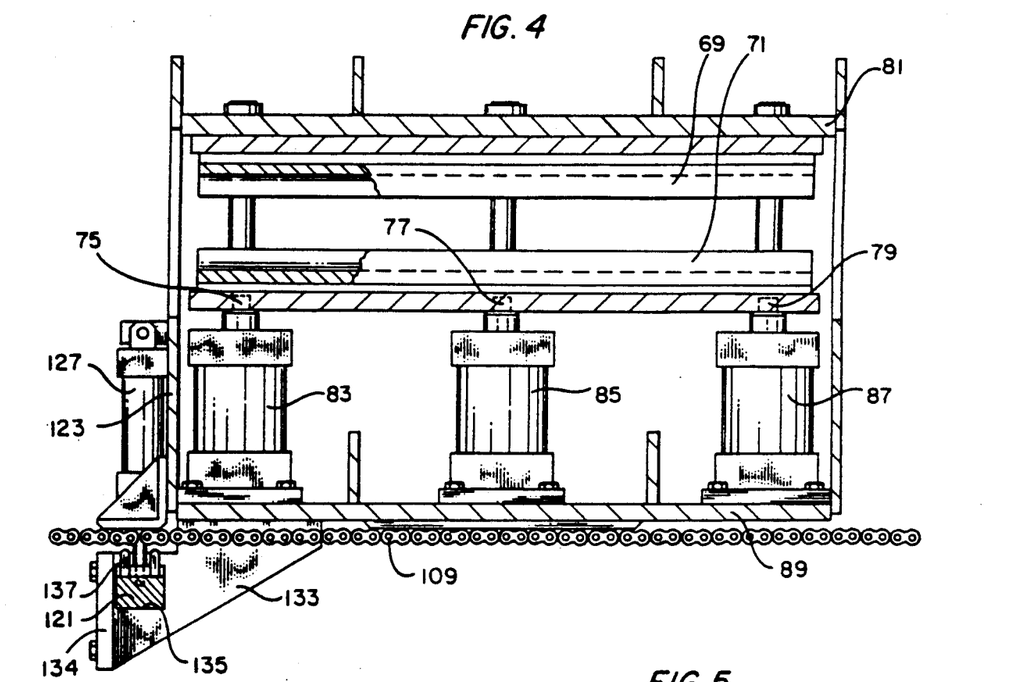
FIG. 4 is a partial, cross-sectional view taken along lines IV.—IV.

The liner 11 next passes to a pulling/crushing station 57 made up by a hydraulic press. The hydraulic press includes first and second hydraulic crushing stations 59, 61 which are mounted on a base 63. As shown in FIGS. 3 and 4, each crushing station 59, 61 comprises a travelling carriage which is provided with a hydraulically actuated crushing die 65, 67 for alternately crushing the liner 11. Each crushing die 65 includes upper and lower longitudinally extending plates 69, 71 (shown in the open position in FIG. 3) which include a semispherical profile 73 for grasping and compressing the liner 11. In the closed position, the plate openings form a liner receiving opening which is aligned with the longitudinal axis defined by the mid-point 55 of the roller openings 56.

As shown in FIG. 4, upper plate 69 is fixedly mounted to the top wall 81 of the travelling carriage 61. The bottom plate 71 is mounted for vertical movement on the output shafts 75, 77, 79 of hydraulic cylinders 83, 85, 87. The hydraulic cylinders are mounted to the bottom wall 89 of the travelling station 61 for simultaneously urging the lower plate 71 in the direction of the upper plate 69.

As shown in FIG. 3, each travelling carriage 59, 61 has travelling wheels 91, 93, 95, 97 mounted on the opposing side walls thereof for movement within spaced horizontal tracks (99, 101 shown in FIG. 3). The base 63 has a motor 103 having an output shaft which drives a belt 105. The belt 105 engages a gearbox 107 which is used to power a drive chain 109. As shown in FIG. 1, the drive chain 109 travels over idler sprockets 111, 113, 115, 117 provided on the base so that the drive chain 109 moves in a path approximately midway between the horizontal tracks 101, 119 beneath the travelling carriages 59, 61.

Figure 5:
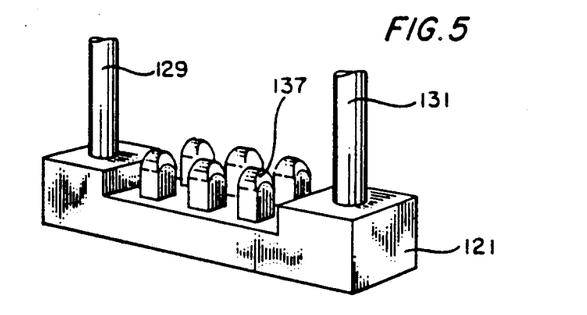
FIG. 5 is an isolated view of the engagement dog used to move the travelling carriages in the apparatus of FIG. 3.

As shown in FIGS. 4 and 5, each travelling carriage 59, 61 has an engagement dog 121 mounted on the front side wall 123 thereof. A pair of hydraulic cylinders 125, 127 are fixedly mounted on the front side wall 123 and have output shafts 129, 131 (FIG. 5) which are joined to the engagement dog 121. A load flange 133 (FIG. 4) extends from the carriage bottom wall 89 and includes a vertical wall portion 134 which defines a recess 135 into which the engagement dog 121 is received. The drive chain 109 passes beneath the carriage bottom wall 89 in a horizontal plane and passes between the teeth 137 of the engagement dog 121 and the carriage bottom wall 89. When hydraulic cylinders 125, 127 are actuated, output shafts 129, 131 are retracted causing the engagement dog 121 to move vertically upward within the recess 135. The teeth 137 then engage the drive chain 109 which is being driven by the gearbox 107 toward the left as viewed in FIG. 4. The engagement dog 121 rides against the vertical portion 134 of the load flange 133 to relieve the drive force from the output shafts 129, 131 of the hydraulic cylinders 125, 127. Carriage 59 is similarly equipped with hydraulic cylinders 139, 141.

Each of the travelling carriages 59, 61 is also provided with a retracting mechanism for returning the carriage to the right as viewed in FIG. 3 to its home position. The retracting mechanism can, for instance, comprise hydraulic cylinders 136, 138 which are arranged in a horizontal plane beneath the carriages 59, 61. Each cylinder is mounted on the base 63 and has an output shaft connected to the respective carriage 59, 61.

The engagement dog cylinders 125, 127 and 139, 141 are selectively actuated to alternately engage and disengage the drive chain 109. As a result, the carriages 59, 61 are alternately moved along the horizontal tracks 99, 101 from a right hand home position to the left, as viewed in FIG. 3. The crushing cylinders (83, 85, 87 in FIG. 4) are also alternately operated, whereby the liner 11 is alternately crushed and then released by the hydraulic press. Return movement of the carriages is accomplished by the actuation of the retracting cylinders 136, 138. Thus, as carriage 59 grips the liner 11 and moves to the left, carriage 61 releases the liner and moves back to the right. Carriage 61 then grips the liner 11 and moves to the left while carriage 59 releases the liner and moves back to the right. The resulting hand-over-hand gripping operation continuously pulls the liner 11 through the crushing station 57. It should be noted, however, that in addition to securely grasping the liner 11, the crushing dies 65,67 also crush and further downsize the outside diameter of the liner. In the embodiment shown in FIG. 3, die 65 reduces the original outside diameter of the liner 11 to a total approximate 10% overall reduction while die 67 produces an overall reduction in the original outside diameter to approximately 12%.

The movement and crushing action of the carriages 59, 61 can be synchronized in a number of ways which will be familiar to those skilled in the art. For instance, each carriage 59, 61 can have an associated set of limit switches 143-150 which are engaged by the drive wheels 91, 93, 95, 97 as the wheels move within the respective tracks 99, 101. In the embodiment shown, switch 144 indicates the home position of carriage 59. (Carriage 59 is shown moved out of the home position in FIG. 3 for ease of illustration.) Both carriages 59 and 61 are shown in the home position in FIG. 1. To start the cycle, carriage 59 grips the liner 11 and leaves the home position traveling to the left. As limit switch 146 is tripped, the second carriage 61 is signaled to begin its cycle by engaging the liner 11 and moving to the left from the home position. As gripping carriage 59 engages the limit switch 148, it is signalled to disengage from the liner 11 and return to the home position where it contacts limit switch 144. Limit switch 150 is a safety shutoff to indicate over travel of the carriage. Limit switches 143, 145, 147 and 149 operate similarly with respect to the second carriage 61. A pulling station, including suitable electrical controls, is commercially available from PM Machine Works, Inc., 2824 S.E. Loop 820, Fort Worth, Texas 76140.

The commercially available pulling station was modified for the purpose of the present invention by the addition of the crushing dies 65, 67 actuable by the crushing cylinders 83, 85, 87, so that station 57 both pulls and crushes the liner.

After leaving the second carriage 61, the liner 11 passes through a final downsizing roller set 153. Roller set 153 is similar to downsizing roller set 19 and has three downsizing rollers (155 shown in FIG. 3) mounted within a frame 157. The downsizing rollers are arranged in a "Y"-shaped configuration identical to that shown in FIG. 2. In this case, however, the vertically oriented bottom roller is adjustably positioned by means of bolt 159 but is not hydraulically actuated as was roller 27. The final roller set 153 provides a 13-15% decrease in the original outside diameter of the liner 11 in the preferred embodiment.

After leaving the final roller set 153, the liner 11 is fed to a guillotine 161 (FIG. 1) where it is cut to an appropriate length, the length being greater than the length of the tubular member to be lined. The liner 11 is then fed to the tubular member 17 to be lined.

Figure 6:
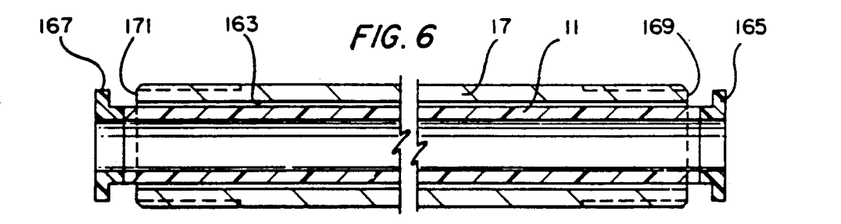
FIG. 6 is a side, cross-sectional view of the tubular member having an elastomeric liner inserted therein and prior to the liner returning to its original outside dimensions, the liner having end caps butt-fused thereon.
Figure 7:
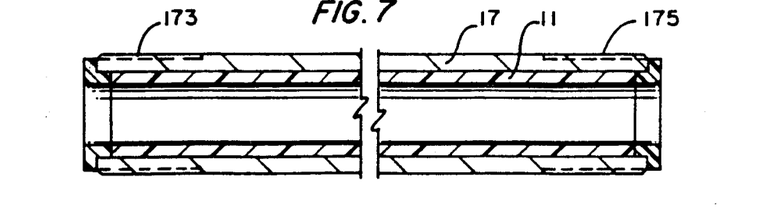
FIG. 7 is similar to FIG. 6, showing the liner having returned to its original outside dimensions to line the tubular member, the end caps having been drawn up snugly against the opposing ends of the tubular member.

FIG. 6 is a side, cross-sectional view of a length of liner 11 which has been downsized and fed into the internal diameter of a tubular member 17 to be lined, illustrating one method for installing end caps on the tubular member. A slight clearance 163 exists between the liner 11 and the internal diameter of the tubular member 17. The liner 11 extends slightly beyond each end of the tubular member 17 in the downsized condition and has a preformed end caps 165, 167 butt-welded thereon. The ends caps 165, 167 are not a part of the original liner 11. The liner 11 is then allowed to expand to substantially its original outside diameter to bond the liner within the tubular member 17. Assuming the reverse expansion characteristics of the liner are correctly calculated, the end caps 165, 167 are drawn snugly up against the ends 169, 171 of the tubular member 17. The tubular member 17 shown in FIG. 7 is a length of oil field pipe having externally threaded ends 173, 175.

Figure 8:
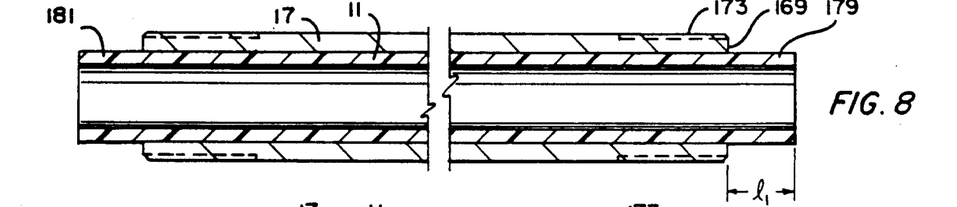
FIG. 8 is a view of a tubular member having an elastomeric liner inserted therein, the liner having returned to its original outside dimensions with the liner opposite ends still extending outwardly from the opposing ends of the tubular member.

FIG. 8 shows an alternate method for installing end caps on the tubular member 17 which does not require a calculation of the reverse expansion characteristics of the liner. A length of liner 11 is first reduced to a downsized outside diameter in a convenient manner, such as by utilizing the apparatus shown in FIG. 1 previously discussed, The length of the downsized liner 11 is selected to be greater than the length of the tubular member at each opposing end 169 by an excess length $l_1$. The downsized liner is inserted into the tubular member 17 and allowed to expand to substantially its original outside diameter to thereby bond the liner 11 within the tubular member 17 with the liner opposite ends 179, 181 still extending outwardly from the opposing ends 169 of the tubular member (see FIG. 8).

Figure 9:
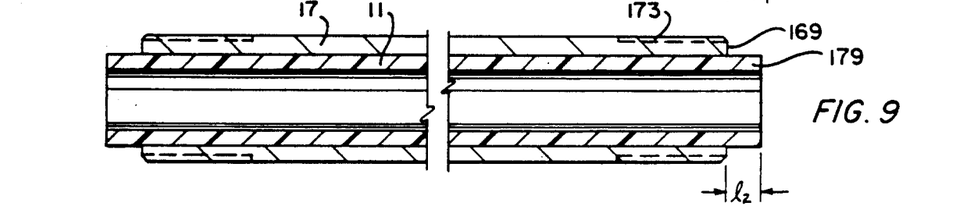
FIG. 9 is similar to FIG. 8, the opposite ends of the liner having been trimmed down to a preselected length.
Figure 10:
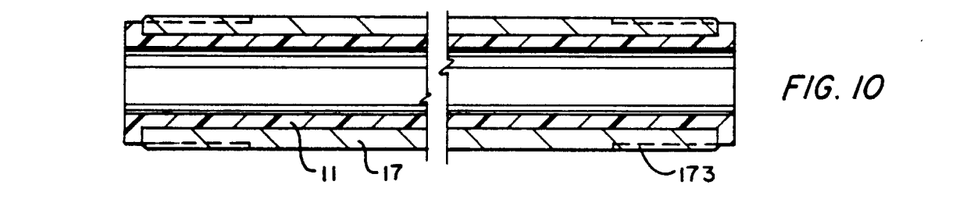
FIG. 10 is a view of the fully lined tubular member, the end caps having been installed by the heating and reforming technique of the invention.
Figure 11:
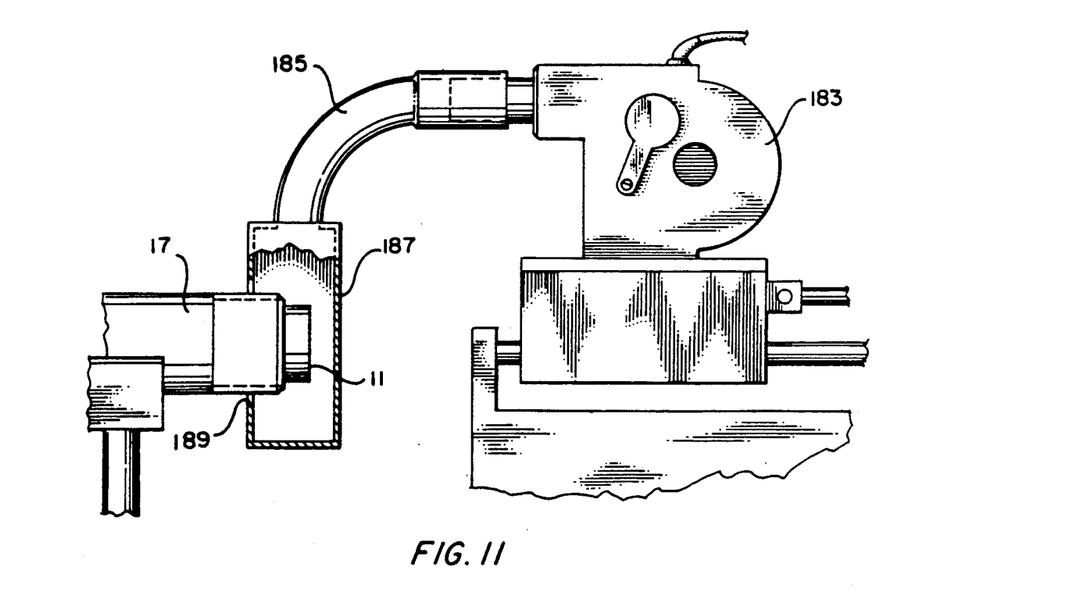
FIG. 11 is a view of the heating device used to heat the tubular member and liner in the method of the invention.

The outside diameter of the liner opposite ends 179, 181 is then increased to approximately the outside diameter of the tubular member 17 while maintaining a constant internal diameter for the liner 11. In order to accomplish this task, the liner excess length $l_1$ is first trimmed to a final, preselected length $l_2$ (FIG. 9). The length $l_2$ is then heated to a malleable state so that the length $l_2$ can be reformed to the desired outside diameter to form a seal with the opposing ends 169 of the tubular member. For instance, a suitable electric heating unit 183 can be utilized to provide a hot air blast at approximately 550° F. which is channeled through the coupling 185 to the enclosure 187. The enclosure 187 is provided with a lateral opening 189 for receiving an end of the tubular member 17. A suitable heat unit 183 is commercially available, for instance, from Grainger Parts of Chicago, Ill. as the "Master Flameless Heat Blower", stock number 4Z717.

Figure 12:
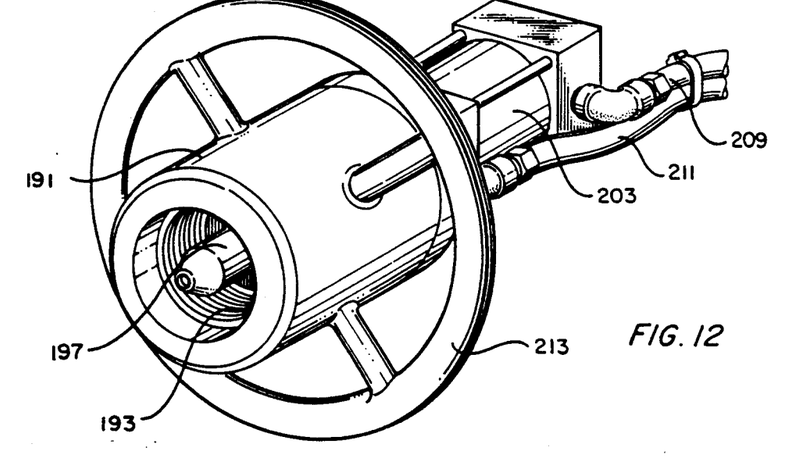
FIG. 12 is a perspective view of the apparatus used to install the liner end caps in the method of the invention.
Figure 13:
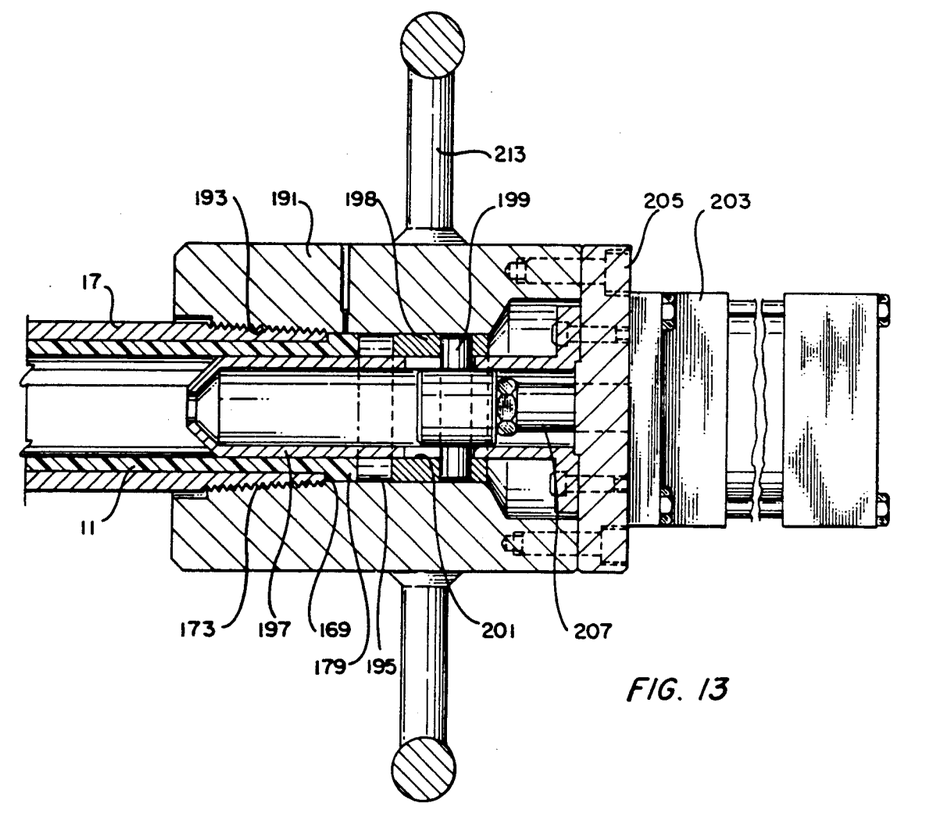
FIG. 13 is a cross-sectional view of the apparatus of FIG. 12 installed on a selected end of the previously lined tubular member.

After heating the liner end 179 to a temperature and for a time sufficient to render the elastomeric material thereof to a malleable state, a collar 191 (FIGS. 12 and 13) is placed about the tubular member 17. As best seen in FIG. 13, the collar 191 is provided with an internally threaded surface 193 for engaging the mating externally threaded surface 173 of the liner 11. The collar 191 is also provided with a circumferential internal recess 195 of the approximate diameter desired for the end cap which is to be formed.

An internal mandrel 197 extends within the open interior of the collar 191 and is spaced apart therefrom to provide a gap for receiving the liner end 179. With the collar 191 engaged about the tubular member 17, the internal mandrel 197 is received flush against the internal diameter of the liner 11 to maintain a constant internal diameter for the liner 11 as the end thereof is being reformed.

Force is then applied to the liner end 179 to flow the malleable end thereof into the collar recess 195, whereby the increased outside diameter of the liner end 179 forms a circumferential seal with the opposing end 169 of the tubular member 17. In the embodiment shown, the force is applied by means of a compression ring 198 which is received within the internal recess 195 of the collar 191. The compression ring 198 carries a transverse pin 199 which travels within a slot 201 provided in the internal mandrel 197. A hydraulic cylinder 203 is attached to the collar 191 by means of bolts 205 and has an output shaft 207 which is aligned with the compression ring 198, for forcing the compression ring 198 in the direction of the liner end 179 as the output shaft 207 is extended. Inlet and outlet hydraulic lines 209, 211 supply operating fluid to the hydraulic cylinder 203. A handle 213 can be provided to facilitate the engagement of the collar 191 on the external threads of the tubular member 17.

The operation of the apparatus and method of the invention should be apparent from the foregoing discussion. A tubular member 17 is lined with an elastomeric liner 11 which has an outside diameter which is initially greater than the inside diameter of the tubular member and with a length which is greater than the length of the tubular member. The liner is reduced to a downsized outside diameter by simultaneously rolling and crushing the liner a preselected amount using downsizing rollers 21 and a hydraulic press 57, whereby the liner retains a standard dimensional ratio in the downsized condition. The liner 11 is then inserted into the tubular member 17 and allowed to expand to substantially its original outside diameter to thereby bond the liner within the tubular member, the liner opposite ends still extending outwardly from the opposing ends of the tubular member.

The outside diameter of the liner opposite ends is then increased to approximately the outside diameter of the tubular member while maintaining a constant internal diameter for the liner by heating and reforming that portion of the liner opposite ends which extend outwardly from the opposing ends of the tubular member, whereby the increased outside diameter of the liner forms a seal with the opposing ends of the member.

As an example of the present method, a steel pipe having an inside diameter of 2.062 inches was lined according to the method of the invention. The liner was a polyethylene pipe having an initial outside diameter of 2.30 inches with a wall thickness of 0.07 inches. The percentage reduction in outside diameter of the liner is shown in Table I as it passed through each stage of the method.

TABLE I

| | 2.30 inch polyethylene liner (all dimensions in inches) | | | | | |
|---|---|---|---|---|---|---|
| | roller set 19 | roller set 20 | roller set 22 | gripping station 59 | gripping station 61 | roller set 153 |
| o.d. | 2.254 | 2.208 | 2.162 | 2.070 | 2.024 | 0.1955 |
| % reduction | 2% | 4% | 6% | 10% | 12% | 15% |

The reduced liner 11 returned to its approximate original outside dimensions within about one half hour and securely bonded within the interior of the pipe 17. The end caps were then installed using the heating and reforming technique previously described.

An invention has been provided with several advantages. Because the reverse expansion characteristics or "memory" of the liner 11 are known, the liner returns to a pre-determined size to fill out and conform to the internal diameter of the tubular member 17 to securely bond the liner within the tubular member. The simultaneous use of rolling and crushing the liner 11 has been found to maintain the standard dimensional ratio of the liner in a downsized condition so that a more approximate linear elongation of the liner is achieved. Because a nearly perfect linear expansion of the liner results, a more uniform bond can be achieved within the internal diameter of the tubular member as the liner reversely expands.

The tubular member can be provided with end caps by reforming the excess liner material which extends beyond the opposing ends of the tubular member. The exact length of excess material is not critical, since the technique does not rely on the reverse expansion characteristics of the material in order to draw up to the opposing ends of the tubular member.

While the invention has been shown in only one of its forms, it is not thus limited but is susceptible to various changes and modifications without departing from the spirit thereof.

I claim:

1. A method of lining a tubular member having opposing ends with an elastomeric liner having opposite ends and an outside diameter which is initially greater than the inside diameter of the tubular member, the method comprising the steps of:

reducing a length of the liner to a downsized outside diameter by passing the liner through a series of downsizing rollers to initially reduce the outside diameter at a first station and through a hydraulic press at a second station to additionally reduce the liner outside diameter, the liner being rolled and simultaneously crushed a preselected amount as it is gripped and pulled through the first and second stations to thereby effect a linear elongation of the liner, whereby the liner retains a standard dimensional ratio in the downsized condition, the length of downsized liner being greater than the length of the tubular member to be lined;

inserting the downsized liner into the tubular member to be lined whereby the liner opposite ends extend outwardly from the opposing ends of the tubular member;

allowing the downsized liner to expand to substantially its original outside diameter whereby the liner makes 360° contact with the inner surface of the tubular member an exerts radial pressure on the tubular member to hold the liner firmly in position with the liner opposite ends still extending outwardly from the opposing ends of the tubular member; and increasing the outside diameter of the liner opposite ends to approximately the outside diameter of the tubular member while maintaining a constant internal diameter of the liner by heating and reforming that portion of the liner opposite ends which extend outwardly from the opposing ends of the tubular member, whereby the increased outside diameter of the liner forms a seal with the opposing ends of the tubular member.

2. The method of lining tubular members of claim 1, wherein the outside diameter of the liner opposite ends is increased by first heating the liner opposite ends to a malleable state and then applying pressure thereto to reform the liner opposite ends to approximately the outside diameter of the tubular member.

3. The method of lining a tubular member of claim 2, wherein the synthetic elastomer selected for use as the liner has a known reverse expansion characteristics and wherein the degree of elongation which is effected is calculated to allow insertion of the liner within the tubular member, reverse expansion of the liner serving to tightly engage the liner within the internal diameter of the tubular member.

4. The method of lining a tubular member of claim 3, wherein the synthetic elastomer selected is a polyolefin material.

5. The method of lining a tubular member of claim 4, wherein the polyolefin material is polyethylene.

6. The method of claim 5, wherein in the liner outside diameter is reduced by passing the length of liner through a series of aligned roller sets, each roller set serving to reduce the liner outside diameter by a preselected, gradual amount, the total percentage reduction in outside diameter being no greater than about 15%.

7. The method of lining a tubular member of claim 6, wherein each roller set includes at least two hemispherical rollers which are aligned to form a liner receiving opening, the size of the liner receiving opening being gradually decreased as the liner passes through the series of aligned roller sets.

8. The method of lining a tubular member of claim 7 wherein the liner prior to being rolled and crushed has an initial outside diameter about 10 to 15% greater than the inside diameter of the tubular member.

* * * * *